United States Patent
Yi et al.

(10) Patent No.: US 10,009,157 B2
(45) Date of Patent: Jun. 26, 2018

(54) METHOD AND APPARATUS FOR SUPPORTING DIFFERENT CELL RANGE PER MODULATION IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days. days.

(21) Appl. No.: 15/305,593

(22) PCT Filed: Apr. 21, 2015

(86) PCT No.: PCT/KR2015/003968
§ 371 (c)(1),
(2) Date: Oct. 20, 2016

(87) PCT Pub. No.: WO2015/163672
PCT Pub. Date: Oct. 29, 2015

(65) Prior Publication Data
US 2017/0041111 A1    Feb. 9, 2017

Related U.S. Application Data

(60) Provisional application No. 61/982,304, filed on Apr. 21, 2014.

(51) Int. Cl.
*H04L 5/12* (2006.01)
*H04L 5/00* (2006.01)
(Continued)

(52) U.S. Cl.
CPC .......... *H04L 5/0046* (2013.01); *H04L 5/0023* (2013.01); *H04L 5/0048* (2013.01);
(Continued)

(58) Field of Classification Search
CPC ..... H04L 27/0008; H04L 27/34; H04L 1/206; H04L 27/36; H04L 27/18; H04L 27/2601;
(Continued)

(56) References Cited

U.S. PATENT DOCUMENTS

2011/0096717 A1* 4/2011 Kim ............... H04B 7/2606
                                                          370/315
2013/0022082 A1* 1/2013 Zhou ............... H04J 13/0059
                                                          375/130

(Continued)

FOREIGN PATENT DOCUMENTS

EP    2 639 983 A1    9/2013

OTHER PUBLICATIONS ("Nokia" effect of eNB power backoff on 256QAM system performance) meeting #75.*

(Continued)

*Primary Examiner* — Rahel Guarino
(74) *Attorney, Agent, or Firm* — Birch, Stewart, Kolasch & Birch, LLP (57) ABSTRACT

A method and apparatus for transmitting data in a wireless communication system is provided. An evolved NodeB (eNB) configures a first power for a first modulation and a second power for a second modulation. A modulation order of the second modulation is higher than a modulation order of the first modulation. The eNB transmits data to at least one of a first user equipment (UE) with the configured first power or a second UE with the configured second power. The configured first power may be greater than the condifued second power. Accordingly, a proactive cell range expansion (P-CRE) may be implemented for the first modulation.

14 Claims, 8 Drawing Sheets

(51) Int. Cl.
H04L 27/26 (2006.01)
H04W 52/14 (2009.01)
H04W 52/26 (2009.01)

(52) U.S. Cl.
CPC ........ *H04L 5/0069* (2013.01); *H04L 27/2601* (2013.01); *H04W 52/143* (2013.01); *H04W 52/262* (2013.01)

(58) Field of Classification Search
CPC . H04L 2025/0342; H04J 3/1694; H04J 14/08; H04W 52/262; H04W 72/02; H04W 28/06; H04W 52/16; H04W 52/367
USPC .......... 375/298, 261, 308; 370/330; 332/103
See application file for complete search history.

(56) References Cited

U.S. PATENT DOCUMENTS

2014/0126530 A1* 5/2014 Siomina ............. H04W 52/146 370/330
2014/0254509 A1* 9/2014 Chen ..................... H04L 5/0058 370/329

OTHER PUBLICATIONS

Huawei, Hisilicon, "Further evaluation on 256QAM", R1-135032, 3GPP TSG RAN WG1 Meeting #75, San Francisco, US, Nov. 2013, (http://www.3gpp.org/ftp/tsg_ran/WG1_RL1/TSGR1_75/Docs/).
LG Electronics, "Further details on 256QAM operation", R1-141338, 3GPP TSG RAN WG1 Meeting #76bis, Shenzhen, China, Mar. 2014, (http://www.3gpp.org/ftp/tsg_ran/WG1_RL1/TSGR1_76b/Docs/).
Nokia, NSN, "Effect of eNB power back-off on 256QAM system performance", R1-135583, 3GPP TSG-RAN WG1 Meeting #75, San Francisco, US, Nov. 2013, (http://www.3gpp.org/ftp/tsg_ran/WG1_RL1/TSGR1_75/Docs/).
Nokia, NSN, "On operation of 256QAM with dynamic eNB power backoff", R1-140556, 3GPP TSG-RAN WG1 Meeting #76, Prague, Czech Republic, Feb. 2014, (http://www.3gpp.org/ftp/tsg_ran/WG1_RL1/TSGR1_76/Docs/).

* cited by examiner

METHOD AND APPARATUS FOR SUPPORTING DIFFERENT CELL RANGE PER MODULATION IN WIRELESS COMMUNICATION SYSTEM

CROSS REFERENCE TO RELATED APPLICATIONS

The present application is the National Stage filing under 35 U.S.C. 371 of International Application No. PCT/KR2015/003968, filed on Apr. 21, 2014, which claims the benefit of U.S. Provisional Application No. 61/982,304 filed on Apr. 21, 2014, the contents of which are all hereby incorporated by reference herein in their entirety.

TECHNICAL FIELD

The present invention relates to wireless communications, and more particularly, to a method and apparatus for supporting different cell range per modulation in a wireless communication system.

BACKGROUND ART

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

In next generation wireless communication systems, a situation, in which a channel condition for a user equipment (UE) improves relative to an existing environment by e.g. small cell deployment or a next-generation interference management scheme (e.g. network-assisted interference cancellation and suppression (NAICS)), may be considered. In this case, introduction of high order modulation, like 256 quadrature amplitude modulation (QAM), may be considered as a part of improvement of spectral efficiency. Therefore, a method for supporting the higher order modulation efficiently may be required.

DISCLOSURE OF INVENTION

Technical Problem

The present invention provides a method and apparatus for supporting different cell range per modulation in a wireless communication system. The present invention provides a method for managing a cell power and providing an associated measurement procedure to support coexistence of 256 quadrature amplitude modulation (QAM) with reduced power and other modulation with non-reduced power using either a small cell or a mid-size power class evolved NodeBs (eNBs).

Solution to Problem

In an aspect, a method for transmitting, by an evolved NodeB (eNB), data in a wireless communication system is provided. The method includes configuring, by the eNB, a first power for a first modulation and a second power for a second modulation, whose modulation order is higher than a modulation order of the first modulation, and transmitting, by the eNB, data to at least one of a first user equipment (UE) with the configured first power or a second UE with the configured second power.

In another aspect, an evolved NodeB (eNB) in a wireless communication system is provided. The eNB includes a memory, a transceiver, and a processor coupled to the memory and the transceiver, and configured to configure a first power for a first modulation and a second power for a second modulation, whose modulation order is higher than a modulation order of the first modulation, and control the transceiver to transmit data to at least one of a first user equipment (UE) with the configured first power or a second UE with the configured second power.

Advantageous Effects of Invention

Higher order modulation, like 256 QAM, can be supported efficiently.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
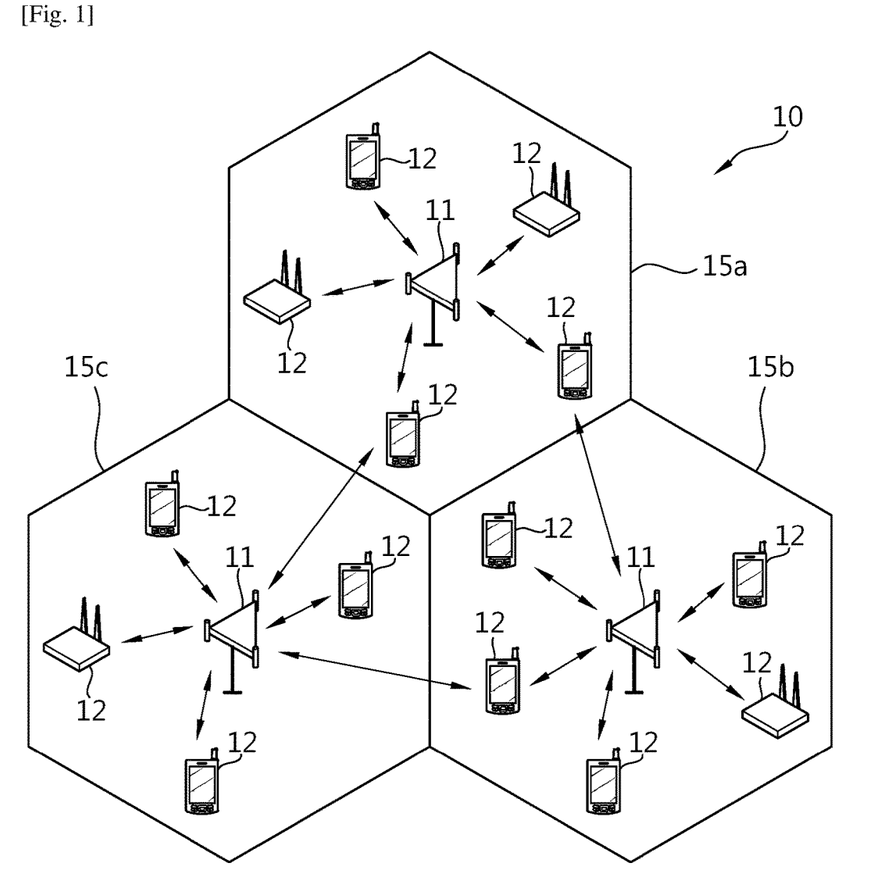
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
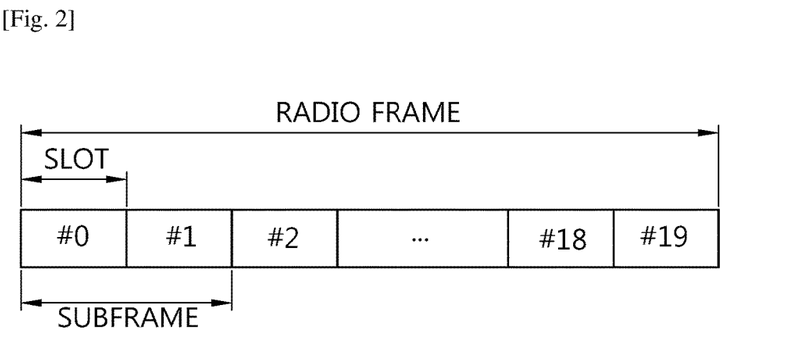
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
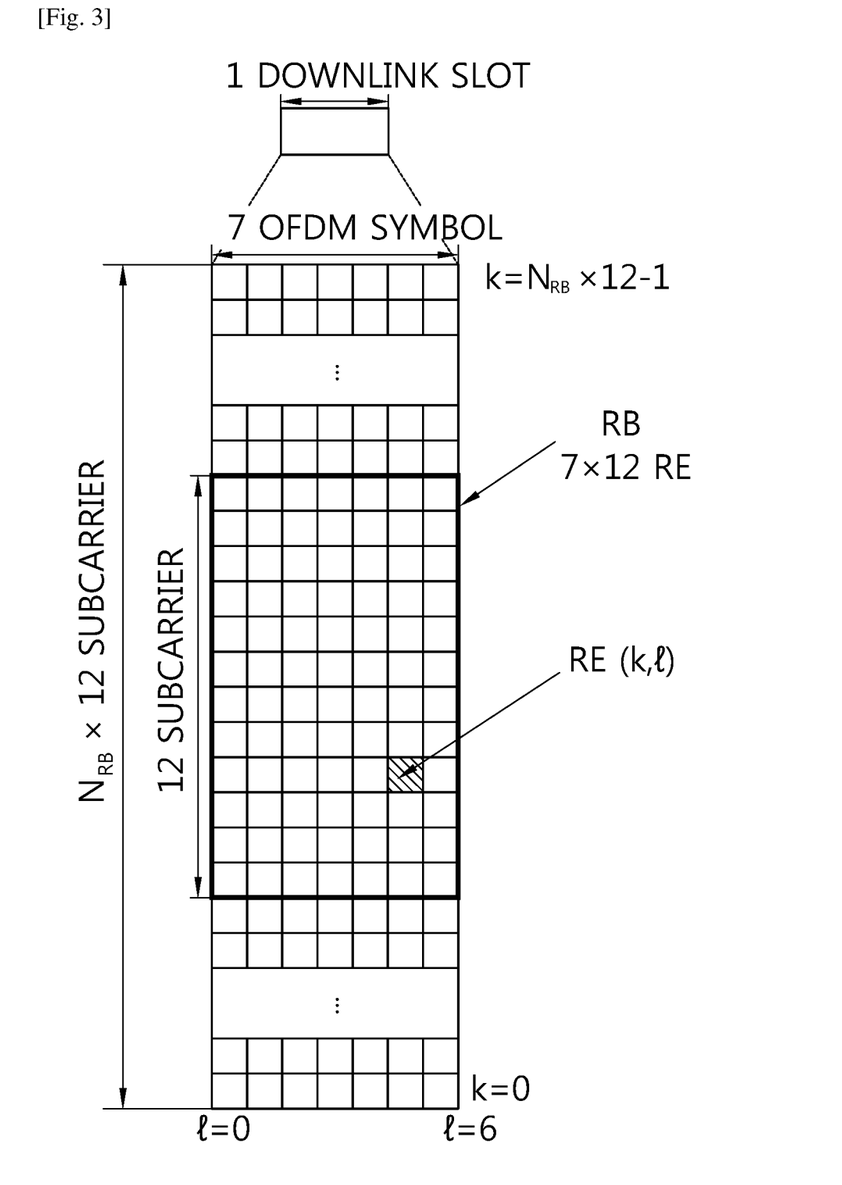
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
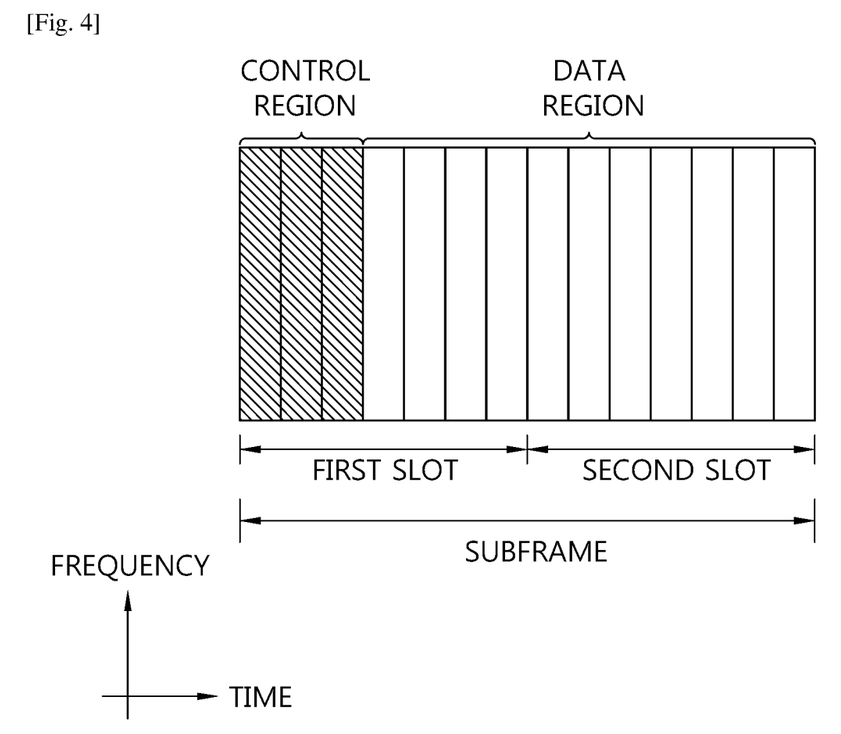
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK)

signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
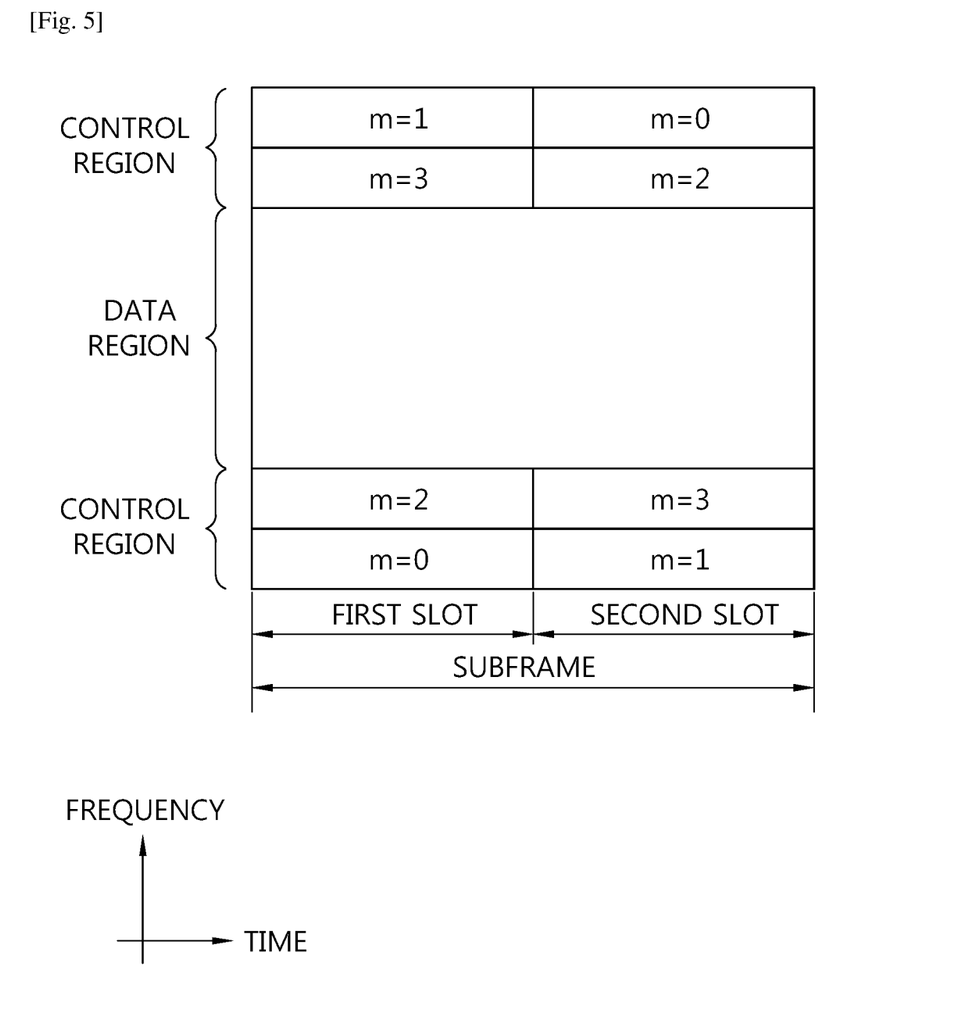
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In perspective of implementation of a hardware, when a transmission side transmits modulated symbols, error may occur by various causes, such as non-linearity of a power amplifier, phase distortion, etc. The error may be considered as self-interference, and accordingly, may cause practically reduction of signal-to-interference-plus-noise ratio (SINR) at a reception side. The error may be represented as a form of an error vector magnitude (EVM), which indicate an error according to misrepresentation of the corresponding modulated symbol during transmission/reception. Equation 1 is an example of the EVM.

$$EVM = \sqrt{\frac{P_{error}}{P_{avg,tx}}} \qquad \langle \text{Equation 1} \rangle$$

In Equation 1, $P_{error}$ indicates power for the error vector, and $P_{avg,tx}$ indicates average transmission power at the transmission side.

As a channel condition for the UE improves, higher order modulation, like 256 quadrature amplitude modulation (QAM), may be introduced. As the modulation order increases, Euclidean distance between modulated symbols on constellation may be reduced, and accordingly, for the same EVM, performance deterioration of a system using the higher order modulation may be greater than that of a system using the lower order modulation.

In order to avoid the performance deterioration when using the higher order modulation, a method for maintaining low EVM may be considered. However generally, configuring lower EVM requirement may restrict hardware implementation, and may increase implementation cost. For another method, a method for reducing range of power operated at the transmission side, in order to reduce error due to non-linearity of a power amplifier, may be considered. This method may be referred to as power backoff. For example, in a system or hardware in which EVM is 8% for transmit power of 24 dBm, when maximum transmit power is reduced to 21 dBm by power backoff, actual EVM can be reduced to 4%.

Hereinafter, a method for performing power backoff efficiently in a system using higher order modulation according to an embodiment of the present invention is described. More specifically, according to an embodiment of the present invention, a cell operation in which power backoff is performed for the higher order modulation, such as 256 QAM, whereas larger cell coverage is configured for the non-higher order modulation, such as non-256 QAM, may be provided. That is, for the non-higher order modulation UEs such as the UE without supporting 256 QAM, the extension of cell coverage may be configured to the non-higher order modulation UEs via cell range expansion (such as 9 dB bias) where the data transmission can be achieved to those UEs via power boosting on data channels. In the description below, for the sake of convenience, it is assumed that the transmission side is the eNB, and the reception side is the UE. It is further assumed that the higher order modulation is 256 QAM. However, the present invention is not limited thereto. The transmission side may be the UE, and the reception side may be the eNB. The higher order modulation may be other modulation.

Figure 6:
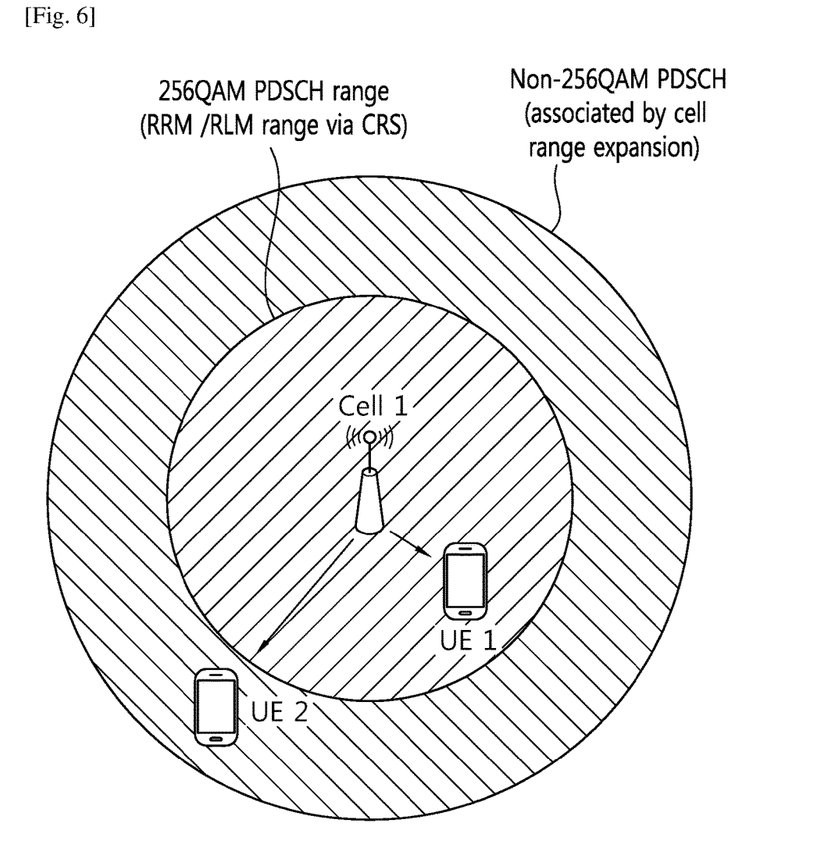
FIG. 6 shows an example of a cell range expansion for non-256 QAM scheduled UEs and 256 QAM scheduled UEs according to an embodiment of the present invention.

FIG. 6 shows an example of a cell range expansion for non-256 QAM scheduled UEs and 256 QAM scheduled UEs according to an embodiment of the present invention. If a network has intention to support 256 QAM operation, and thus, requires power backoff to transmit 256 QAM-modulated data, the network may transmit cell specific reference signal (CRS) and PDCCH with reduced power by power backoff, regardless of whether 256 QAM scheduling is configured/enabled or not. Thus, overall cell coverage may be configured without cell range expansion (CRE). Referring to FIG. 6, 256 QAM PDSCH range is configured by radio resource management (RRM)/radio link management (RLM) range via CRS.

Further, since the cell can support a UE in terms of data transmission by boosting data power as well as demodulation reference signal (DMRS) power, the UE, which may or may not support 256 QAM, may be associated with the cell via CRE (bias of cell association). Once the UE is associated with the cell, to achieve reasonable performance, necessary performance enhancement in terms of control channel transmission as well as data transmission may be necessary. Referring to FIG. 6, non-256 QAM PDSCH range, which is associated by CRE, is configured.

Figure 7:
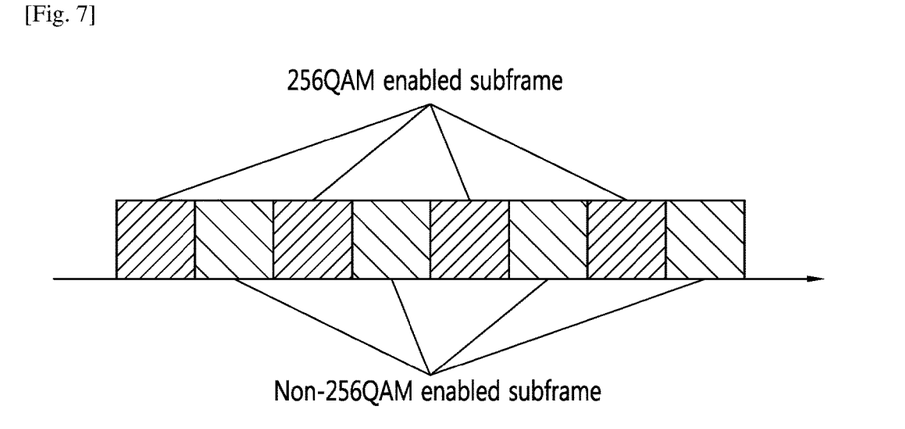
FIG. 7 shows an example of multiplexing of 256 QAM enabled subframes and non-256 QAM enabled subframes according to an embodiment of the present invention.

FIG. 7 shows an example of multiplexing of 256 QAM enabled subframes and non-256 QAM enabled subframes according to an embodiment of the present invention. To support efficient operation according to an embodiment of the present invention, a time division multiplexing (TDM) scheme where 256 QAM-enabled subframes and non-256 QAM enabled subframes are multiplexed in time domain may be considered. Referring to FIG. 7, 256 QAM-enabled subframes and non-256 QAM enabled subframes are configured alternately by the TDM scheme.

Figure 8:
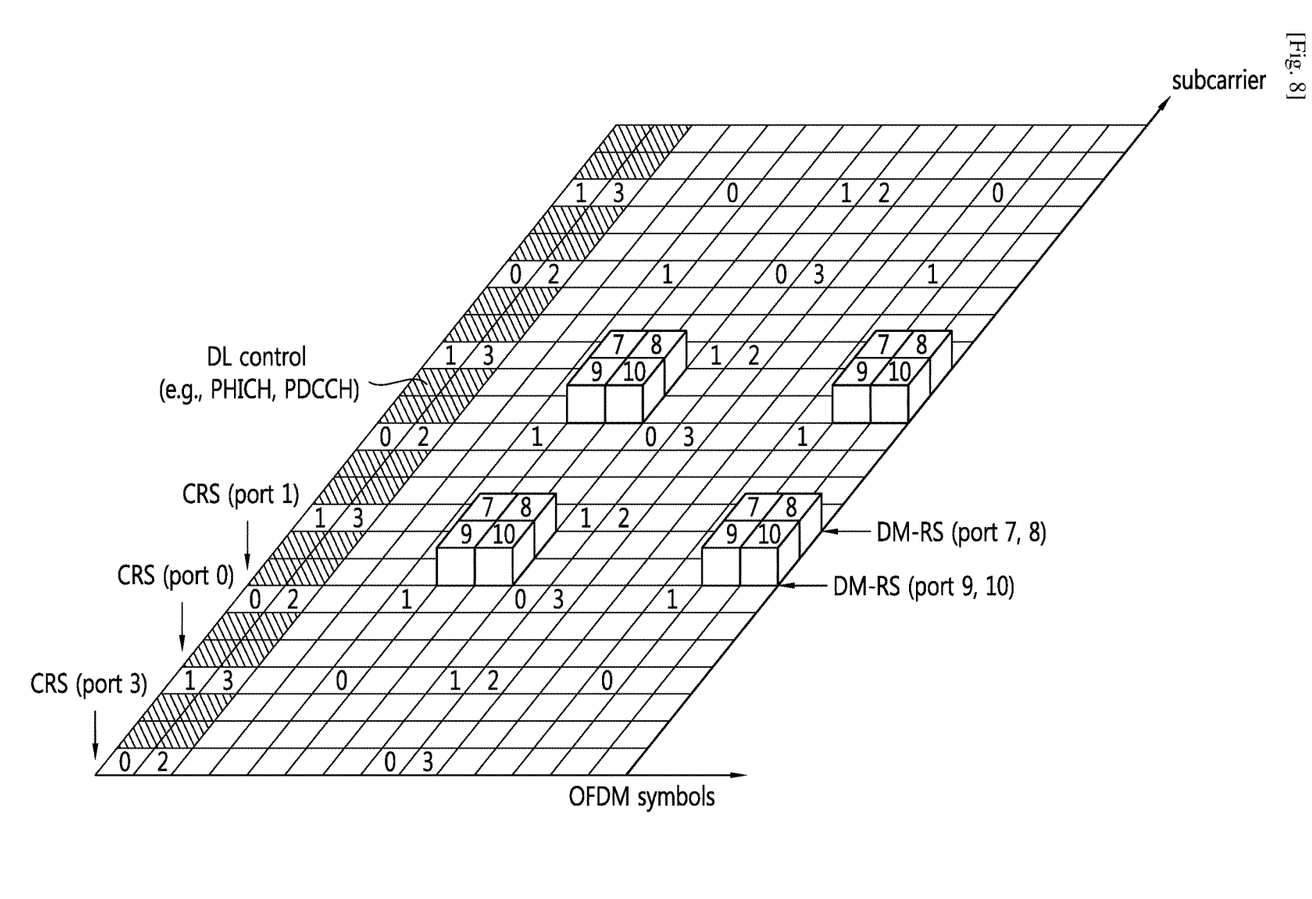
FIG. 8 shows an example of transmission power of a non-256 QAM enabled subframe according to an embodiment of the present invention.

FIG. 8 shows an example of transmission power of a non-256 QAM enabled subframe according to an embodiment of the present invention. Referring to FIG. 8, in the non-256 QAM enabled subframe, power for DMRS and PDSCH is boosted. Accordingly, non-256 QAM modulation may correspond to cell range expansion.

Figure 9:
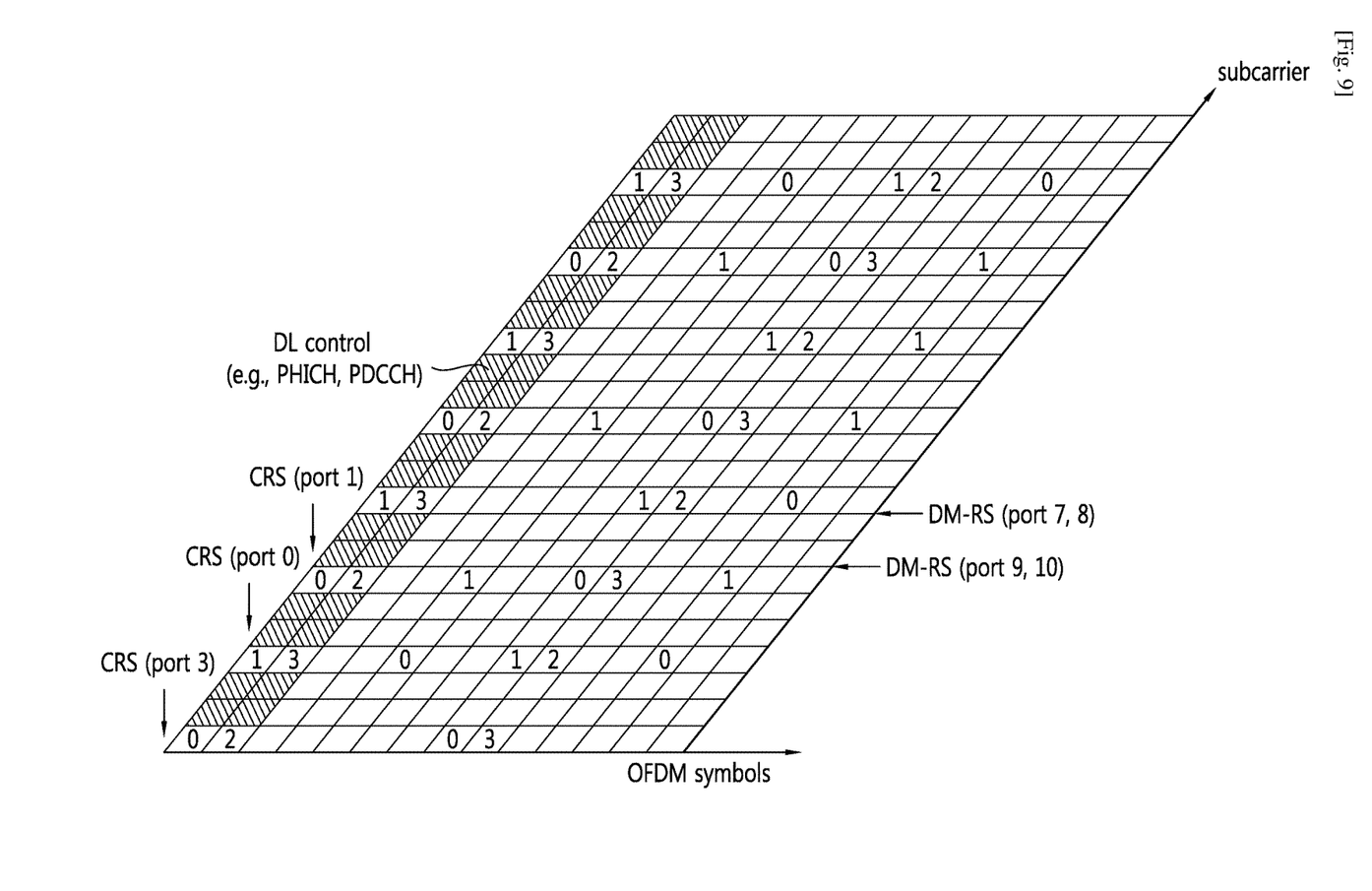
FIG. 9 shows an example of transmission power of a 256 QAM enabled subframe according to an embodiment of the present invention.

FIG. 9 shows an example of transmission power of a 256 QAM enabled subframe according to an embodiment of the present invention. Referring to FIG. 9, in the 256 QAM enabled subframe, power for DMRS and PDSCH is the same as the other signal, e.g. CRS. Or, power for DMRS and PDSCH may be lowered relative to the non-256 QAM enabled subframe. Accordingly, 256 QAM modulation may not correspond to cell range expansion.

For the sake of convenience, the cell range expansion described above according to an embodiment of the present invention may be called proactive cell range expansion (P-CRE). The P-CRE is different from the conventional CRE in that the P-CRE does not require absolute blank subframe (ABS) technique from dominant interferer to achieve better SINR, rather the cell coverage may be determined by 256 QAM enabled subframe transmission or CRS power based on power backoff. Further, the P-CRE may allow the UE to receive better quality of PDSCH in non-256 QAM enabled subframe where power backoff is not utilized and thus additional power boosting on DMRS and PDSCH may be considered. However, it is not prohibited to increase power boosting on CRS as well in the non 256 QAM enabled subframe. Also, in the description above, it is assumed that 256 QAM-enabled subframes and non-256 QAM enabled subframes are multiplexed in TDM manner. However, the present invention is not limited to thereto, and 256 QAM operation may be enabled in a subset of PRBs and/or a subset of subframes without loss of generality.

Signaling for the P-CRE operation according to an embodiment of the present invention is described. For the cell which performs P-CRE operation (hereinafter, P-CRE cell), it is expected that a signal to indicate whether the cell performs P-CRE operation or not is needed. The presence of the P-CRE operation may be exchanged between eNBs via backhaul signaling. The serving cell may utilize the information to configure proper threshold of cell selection criteria or when it determines a target cell for handover. The presence of the P-CRE operation may also be signaled via master information block (MIB) or system information block (SIB) so that the UE may acquire the information on the P-CRE operation and then use the information for cell selection/reselection. When the UE is associated with the P-CRE cell, the UE may be configured with a set of PRBs and/or a set of subframes where 256 QAM-enabled power backoff is used and/or with a set of PRBs and/or a set of subframes where 256 QAM-enabled power backoff is not used. Or, the UE may be configured with different power boosting parameters in different subframe sets and/or resource sets.

Along with the signal indicating the presence of the P-CRE operation, a power backoff value or an additional data boosting value, which indicates how much cell range expansion may be occurred when power backoff is not used, may be additionally indicated. This may be used in cell selection/reselection decision as well as in handover or small cell group (SCG)/secondary eNB (SeNB) carrier addition.

The set of subframes used for non-256 QAM and 256 QAM may be exchanged among neighbor cells so that proper interference mitigation techniques can be applied. For example, neighbor cells may reduce the interference in 256 QAM-enabled subframes to support high throughput by 256 QAM scheduling. Whereas, some additional power boosting on non-256 QAM enabled subframes may be attempted to cope with higher interference from power boosting on data channel. For example, this information may be informed to UEs of the serving cell which is a victim cell from the P-CRE cell for the assistance on data cancellation, etc. In other words, power variation information of the P-CRE cell may be informed to neighbor cells for appropriate interference handling mechanisms. Also, the information on the sets of subframes (256 QAM/non-256 QAM or regular power/boosted power) may be used for NAICS capable UEs. For example, the P-CRE cell may only utilize DMRS based transmission at least in boosted power (non-256 QAM) subframes. Thus, this information may be useful for NAICS capable/performing UEs to minimize the blind decoding overhead.

Cell association for the P-CRE operation according to an embodiment of the present invention is described. Similar to the CRE, the UE may be associated with the P-CRE cell via cell-association bias. To support this, the UE may be configured with different offset value for P-CRE cells in terms of triggering A3 type events which is triggered when the UE experiences neighbor cell becomes better than the serving cell. Or, if the UE knows whether the cell performs the P-CRE operation or not, it may add power backoff value to its reference signal received power (RSRP) measurement to reflect potential cell range expansion when power backoff is not used. Since these additional signaling may not be available to legacy UEs, for the legacy UE, it may be assumed that normal cell association procedure is attempted where the network may use implicit/explicit cell association bias to attach the legacy UE to the P-CRE cell.

CRS power according to an embodiment of the present invention is described. To guarantee constant power across subframe and within a subframe, CRS power may be determined as the same value regardless of power backoff. For example, if power backoff of 6 dBm with maximum power of 30 dBm is configured, CRS power may be determined based on 24 dBm maximum power assuming power backoff of 6 dBm. The legacy UE supporting enhanced inter-cell interference coordination (eICIC) may be associated with P-CRE cell without any further enhancement where system information may be given to the UE via dedicated signaling. To enhance the performance of physical broadcast channel (PBCH), it may be considered to increase the power on PBCH. If power boosting on PDCCH cannot be attempted in 256 QAM-enabled subframes, the legacy UE may be scheduled with enhanced PDCCH (EPDCCH) in 256 QAM-enabled subframes and may be scheduled with PDCCH in other subframes. To support the legacy UE without eICIC capability or handle legacy UEs in a multi-cell environment such as indoor-small cell scenarios where multiple small cells may perform P-CRE operations, restricted measurement subframe set based measurement may not be sufficient, if different CRS power is used in different subframe sets. Thus, the same CRS power throughout the subframes may need to be kept. Thus, it may not be necessary to perform restricted subframe set based RRM measurement in terms of CRS power. However, since power boosting on data channel may be used differently per subframe sets, still, configuration of restricted measurement subframe set for RRM measurement may be useful.

PDCCH power according to an embodiment of the present invention is described. It is important to maintain PDCCH coverage to support UEs in non-256 QAM PDSCH range, such as UE2 in FIG. 6. Thus, power boosting on PDCCH power may be considered where power backoff is not applied to PDCCH transmission regardless of 256 QAM enabled subframes or not. However, to meet power backoff mechanism, it may be further considered to use boosted power on PDCCH only in non-256 QAM enabled subframes such that PDCCH-based scheduling in those subframes are used whereas EPDCCH-based scheduling in other subframes are used or those UEs (such as UE2 in FIG. 6) may not be scheduled in 256 QAM-enabled subframes. Or, PDCCH scheduled to those UEs in non-256 QAM PDSCH region may be power-boosted such that PDCCH coverage for those UEs can be protected. In summary, the UE operating in non-256 QAM subframes or not configured with 256 QAM or not scheduled with 256 QAM may receive power-boosted PDCCH for coverage. Alternatively, PDCCH may be transmitted using the same power without power backoff, whereas CRS power is reduced considering potential power backoff to address the coverage. Or, PDCCH power on cell specific search space (CSS) may be used with high power, whereas PDCCH on UE specific search space (USS) may be used with lower power. However, the power difference between high power and low power should support eNB requirement on dynamic power range.

DMRS/PDSCH power according to an embodiment of the present invention is described. Additional PDSCH power may be boosted whenever power backoff is not used. To allow different power ratio between CRS and PDSCH, and also PDSCH to channel state information reference signal (CSI-RS), the followings may be considered.

(1) Different $P_A$, $P_B$ value per subframe set: Different power ratio between CRS and PDSCH may be given to the UE for each subframe set (or per different range). Since PDSCH may be boosted more compared to the current specification, a new set of ratio values such as for $P_A$ may be considered (such as $P_A=\{-6$ dB, $-4.77$ dB, . . . 3 dB, 4 dB, 5 dB, 6 dB, 7 dB, . . . \}.)

(2) Separate Pc value per subframe set: To reflect different PDSCH power, separate Pc may be configured per subframe set where power backoff is used or not. To keep the same CSI-RS power across subframes, separate Pc may be considered. Or, it may be also considered to use different CSI-RS power where Pc may be used consistent whereas the same CSI-RS power used across subframes belonging to the same subframe set and the same CSI-RS resource configuration.

RRM measurement according to an embodiment of the present invention is described. Since CRS and/or CSI-RS power is constant across subframes according to an embodiment of the present invention, RRM measurement may be achieved without any further modification. When attaching a cell, however, different bias (e.g., reference signal received quality (RSRQ) bias) may be necessary to attach the UE to the P-CRE cell. For that, separate offset per cell rather than per frequency may be needed. When CSI-RS based measurement is introduced, a subset based restriction where the UE performs measurement only in a configured subset may be considered. For CSI feedback, it is desirable to separate a set of subframes where power back off is applied or not.

Figure 10:
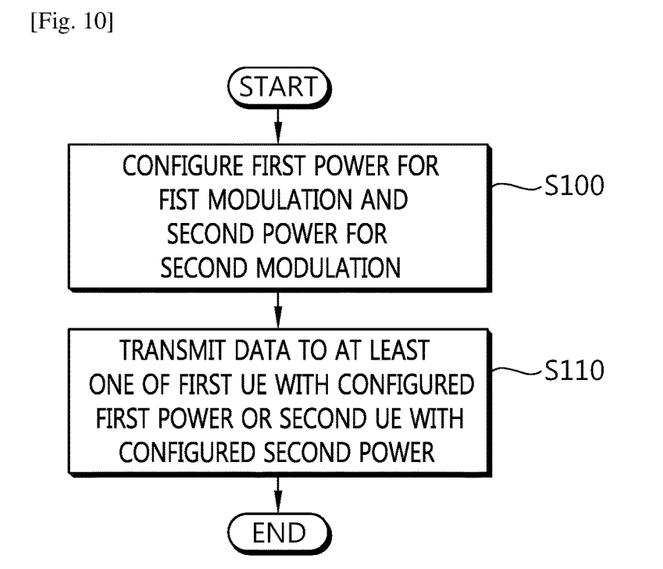
FIG. 10 shows an example of a method for transmitting data according to an embodiment of the present invention.

FIG. 10 shows an example of a method for transmitting data according to an embodiment of the present invention.

In step S100, the eNB configures a first power for a first modulation and a second power for a second modulation, whose modulation order is higher than a modulation order of the first modulation. The first modulation may be non-256 QAM, and the second modulation may be 256 QAM. The configured first power may be greater than the configured second power. The first power may be configured by power boosting, which comprises increasing power of DMRS/PDSCH. The second power is configured by power backoff, which comprises deceasing power of CRS/PDCCH.

In step S110, the eNB transmits data to at least one of a first UE with the configured first power or a second UE with the configured second power. Subframes for transmitting the data to the first UE and subframes for transmitting the data to the second UE may be multiplexed in a TDM manner. Or, PRBs for transmitting the data to the first UE and PRBs for transmitting the data to the second UE may be distinguished from each other.

According to an embodiment of the present invention, a range of a cell, served by the eNB, may be expanded. This may be called P-CRE. The eNB may transmit an indication indicating that the range of the cell is expanded to other eNB. Further, the eNB may transmit an indication indicating that the range of the cell is expanded to a UE via MIB/SIB.

Figure 11:
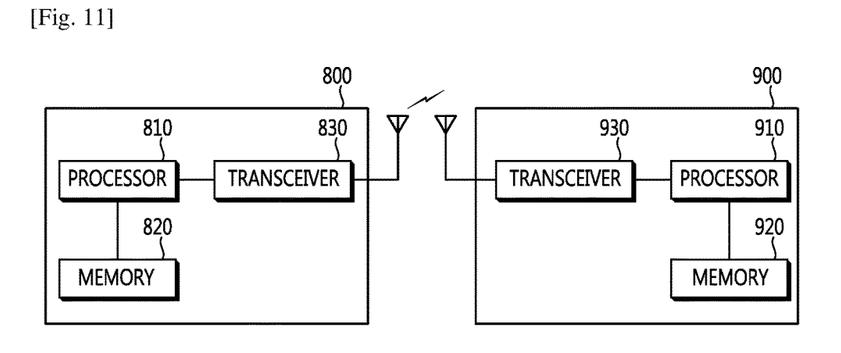
FIG. 11 shows a wireless communication system to implement an embodiment of the present invention.

FIG. 11 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by an evolved NodeB (eNB), data in a wireless communication system, the method comprising:
    configuring, by the eNB, a first power for a first modulation and a second power for a second modulation, wherein a modulation order of the second modulation is higher than a modulation order of the first modulation; and
    transmitting, by the eNB, data to at least one of a first user equipment (UE) with the configured first power with the first modulation or a second UE with the configured second power with the second modulation,
    wherein a range of a cell served by the eNB is expanded when the eNB transmits the data with the configured first power,
    wherein the first power is configured by power boosting, and
    wherein the power boosting comprises increasing power of a demodulation reference signal (DMRS) and a physical downlink shared channel (PDSCH).

2. The method of claim 1, wherein the first modulation is non-256 quadrature amplitude modulation (QAM), and wherein the second modulation is 256 QAM.

3. The method of claim 1, wherein the configured first power is greater than the configured second power.

4. The method of claim 1, wherein the second power is configured by power backoff.

5. The method of claim 4, wherein the power backoff comprises deceasing power of a cell specific reference signal (CRS) and a physical downlink control channel (PDCCH).

6. The method of claim 1, wherein subframes for transmitting the data to the first UE and subframes for transmitting the data to the second UE are multiplexed in a time division multiplexing (TDM) manner.

7. The method of claim 1, wherein physical resource blocks (PRBs) for transmitting the data to the first UE and PRBs for transmitting the data to the second UE are distinguished from each other.

8. The method of claim 1, further comprising:
    transmitting an indication indicating that the range of the cell is expanded to other eNB.

9. The method of claim 1, further comprising:
    transmitting an indication indicating that the range of the cell is expanded to the first UE or the second UE via a master information block (MIB) or a system information block (SIB).

10. An evolved NodeB (eNB) in a wireless communication system, the eNB comprising:
    a memory;
    a transceiver; and
    a processor coupled to the memory and the transceiver, and configured to:
    configure a first power for a first modulation and a second power for a second modulation, wherein a modulation order of the second modulation is higher than a modulation order of the first modulation, and
    control the transceiver to transmit data to at least one of a first user equipment (UE) with the configured first power with the modulation or a second UE with the configured second power with the second modulation,
    wherein a range of a cell served by the eNB is expanded when the eNB transmits the data with the configured first power,
    wherein the first power is configured by power boosting, and
    wherein the power boosting comprises increasing power of a demodulation reference signal (DMRS) and a physical downlink shared channel (PPSCH).

11. The eNB of claim 10, wherein the first modulation is non-256 quadrature amplitude modulation (QAM), and wherein second modulation is 256 QAM.

12. The eNB of claim 10, wherein the configured first power is greater than the configured second power.

13. The eNB of claim 10, wherein the second power is configured by power backoff.

14. The eNB of claim 13, wherein the power backoff comprises deceasing power of a cell specific reference signal (CRS) and a physical downlink control channel (PDCCH).

* * * * *